(12) United States Patent
Klaus-Nietrost et al.

(10) Patent No.: US 11,519,101 B2
(45) Date of Patent: Dec. 6, 2022

(54) FUNCTIONALIZATION OF FOREIGN MATERIAL IN LYOCELL-METHODS

(71) Applicant: LENZING AKTIENGESELLSCHAFT, Lenzing (AT)

(72) Inventors: Christoph Klaus-Nietrost, Vöcklabruck (AT); Richard Herchl, Ried im Innkreis (AT); Christian Weilach, Vöcklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 168 days.

(21) Appl. No.: 16/962,209

(22) PCT Filed: Jan. 14, 2019

(86) PCT No.: PCT/EP2019/050739
§ 371 (c)(1),
(2) Date: Jul. 14, 2020

(87) PCT Pub. No.: WO2019/138091
PCT Pub. Date: Jul. 18, 2019

(65) Prior Publication Data
US 2021/0062370 A1 Mar. 4, 2021

(30) Foreign Application Priority Data
Jan. 15, 2018 (EP) .................................. 18151692

(51) Int. Cl.
*D01F 2/02* (2006.01)
*D01F 2/06* (2006.01)
(Continued)

(52) U.S. Cl.
CPC .............. *D01F 2/08* (2013.01); *B29C 48/022* (2019.02); *B29C 48/05* (2019.02); *B29C 48/08* (2019.02);
(Continued)

(58) Field of Classification Search
CPC .... B29B 2017/0268; B29B 2017/0272; B29C 48/022; B29C 48/08; B29C 48/919;
(Continued)

(56) References Cited

U.S. PATENT DOCUMENTS 3,801,273 A 4/1974 Mays
3,937,671 A 2/1976 Gruntfest et al.
(Continued)

FOREIGN PATENT DOCUMENTS

CN 102154722 A 8/2011
CN 107208325 A 9/2017
(Continued)

OTHER PUBLICATIONS

International Search Report of corresponding PCT/EP2019/050739, dated Mar. 22, 2019, 6 pages.
(Continued)

*Primary Examiner* — Leo B Tentoni
(74) *Attorney, Agent, or Firm* — Lewis Roca Rothgerber Christie LLP

(57) ABSTRACT

Method of manufacturing a regenerated cellulosic molded body, wherein the method comprises supplying a starting material which comprises cellulose and at least one foreign matter, transferring at least a part of the starting material with at least a part of the at least one foreign matter into a spinning mass which additionally contains a solvent for solving at least a part of the cellulose of the starting material in the solvent, and extruding the spinning mass to the molded body, and subsequently precipitating in a spinning (Continued)

bath, wherein thereby the molded body is obtained, wherein the molded body comprises cellulose and at least a part of the at least one foreign matter.

15 Claims, 3 Drawing Sheets

(51) Int. Cl.
| | |
|---|---|
| D01F 2/10 | (2006.01) |
| D01F 2/12 | (2006.01) |
| D01F 2/08 | (2006.01) |
| B29C 48/00 | (2019.01) |
| B29C 48/88 | (2019.01) |
| B29C 48/05 | (2019.01) |
| C08J 11/08 | (2006.01) |
| D01D 1/02 | (2006.01) |
| D01D 5/06 | (2006.01) |
| D01F 1/10 | (2006.01) |
| D01F 13/02 | (2006.01) |
| B29C 48/08 | (2019.01) |
| B29K 1/00 | (2006.01) |
| B29K 105/26 | (2006.01) |
| B29K 467/00 | (2006.01) |
| B29K 475/00 | (2006.01) |
| B29B 17/02 | (2006.01) |

(52) U.S. Cl.
CPC ............ *B29C 48/919* (2019.02); *C08J 11/08* (2013.01); *D01D 1/02* (2013.01); *D01D 5/06* (2013.01); *D01F 1/10* (2013.01); *D01F 13/02* (2013.01); *B29B 2017/0268* (2013.01); *B29B 2017/0272* (2013.01); *B29K 2001/00* (2013.01); *B29K 2001/08* (2013.01); *B29K 2105/26* (2013.01); *B29K 2467/00* (2013.01); *B29K 2475/00* (2013.01); *B29K 2995/0046* (2013.01); *C08J 2301/02* (2013.01); *D10B 2201/22* (2013.01); *D10B 2201/24* (2013.01); *D10B 2401/061* (2013.01)

(58) Field of Classification Search
CPC ............ B29K 2001/00; B29K 2001/08; B29K 2105/26; B29K 2467/00; B29K 2475/00; D01D 1/02; D01D 5/06; D01F 1/10; D01F 2/02; D01F 2/06; D01F 2/08; D01F 2/10; D01F 2/12; D10B 2201/22; D10B 2201/24
USPC .... 264/187, 188, 191, 203, 178 F, 211, 913, 264/914, 920
See application file for complete search history.

(56) References Cited

U.S. PATENT DOCUMENTS

| | | |
|---|---|---|
| 4,145,533 A | 3/1979 | Farrall |
| 4,246,221 A | 1/1981 | McCorsley |
| 4,345,039 A | 8/1982 | Cowan et al. |
| 5,240,530 A | 8/1993 | Fink |
| 5,598,980 A | 2/1997 | Dilly-Louis et al. |
| 5,601,767 A | 2/1997 | Firgo et al. |
| 5,609,676 A | 3/1997 | Von der Eltz |
| 5,722,603 A | 3/1998 | Costello et al. |
| 6,258,304 B1 | 7/2001 | Bahia |
| 2002/0189035 A1* | 12/2002 | Ruf ............. D01F 2/00 264/203 |
| 2003/0205626 A1* | 11/2003 | Hansen ............ B29B 17/0042 238/83 |
| 2010/0294980 A1* | 11/2010 | Hartmann .............. D01F 1/10 252/67 |
| 2011/0236678 A1* | 9/2011 | Binder ............ B29B 17/0042 428/338 |
| 2013/0108676 A1* | 5/2013 | Redlinger ............. D01F 1/10 424/443 |
| 2015/0329771 A1 | 11/2015 | Danielec et al. |
| 2018/0002836 A1* | 1/2018 | Sperger ................ D01F 2/08 |

FOREIGN PATENT DOCUMENTS

| | | |
|---|---|---|
| DE | 44 09 335 A1 | 9/1994 |
| DE | 198 82 319 T1 | 7/2000 |
| DE | 696 18 988 T2 | 9/2002 |
| EP | 0 205 346 B1 | 12/1986 |
| EP | 0 636 646 A1 | 2/1995 |
| EP | 0 681 896 A1 | 11/1995 |
| EP | 0 717 131 A1 | 6/1996 |
| EP | 3 339 504 A1 | 6/2018 |
| EP | 3 511 140 A1 | 7/2019 |
| WO | WO 96/07778 A1 | 3/1996 |
| WO | WO 97/021490 A2 | 6/1997 |
| WO | WO 98/46814 A1 | 10/1998 |
| WO | WO 02/40766 A2 | 5/2002 |
| WO | WO 2013/182801 A1 | 12/2013 |
| WO | WO 2014/045062 A1 | 3/2014 |
| WO | WO 2014/086579 A1 | 6/2014 |
| WO | WO 2015/077807 A1 | 6/2015 |
| WO | WO 2016/123643 A1 | 8/2016 |

OTHER PUBLICATIONS

Witten Opinion of corresponding PCT/EP2019/050739, dated Mar. 22, 2019, 10 pages.
Search Report of corresponding EP 18151692.3, dated Jul. 12, 2018, 9 pages.
Office Action of corresponding TW application 108101356, dated Mar. 18, 2020, 23 pages with English translation.
Ouchi, et al., "A new methodology to recycle polyester from fabric blends with cellulose," Cellulose 17.1 (2010), pp. 215-222.
Golova, et al., "Structure—Properties Interrelationships in Multicomponent Solutions Based on Cellulose and Fibers Spun Therefrom," Cellulose—Fundamental Aspects, chapter 13, 2013, pp. 303-342.
Scholz, "Thermoplastisches Polyurethan," Index | FAPU 15, Nov./Dez. 2002 | Fachartikel, 4 pages.
Tausif, et al., "Mechanical Properties of Nonwoven Reinforced Thermoplastic Polyurethane Composites," Material 2017, 10, 618, 13 pages.
"Einzigartig wie ein Fingerabdruck", Markt & Technik 38/2013, 2 pages.

* cited by examiner

FUNCTIONALIZATION OF FOREIGN MATERIAL IN LYOCELL-METHODS

CROSS-REFERENCE TO RELATED APPLICATION

This application is a National Phase Patent Application and claims priority to and the benefit of International Patent Application No. PCT/EP2019/050739, filed Jan. 14, 2019, which claims priority to and the benefit of European Patent Application No. EP 18151692.3, filed Jan. 15, 2018, the entire contents of all of which are incorporated herein by reference.

FIELD OF INVENTION

The invention concerns a method of manufacturing a regenerated cellulosic molded body and a use.

BACKGROUND

Chemical fibers and regenerated fibers, respectively, which are manufactured by a wet spinning method which is called viscose method, are denoted as viscose fibers. The starting raw material of the viscose method is cellulose which is provided on basis of wood. From this starting raw material wood, the high-purity cellulose in form of chemical pulp is obtained. In subsequent process stages, the pulp is first treated with caustic soda, whereby alkali cellulose is formed. In a subsequent conversion of this alkali cellulose with carbon disulfide, cellulose-xanthate is formed. From this, by further supplying caustic soda, the viscose-spinning solution is generated which is pumped through openings of shower-like spinning nozzles into a spinning bath. There, by coagulation, one viscose-filament per spinning nozzle opening is generated. The viscose-filaments produced in such a manner are subsequently cut to viscose-staple fibers.

Lyocell denotes a regenerated fiber type comprising cellulose, which is manufactured according to a direct solvent method. The cellulose for the lyocell-method is extracted from the raw material wood. The such obtained pulp may subsequently be solved in N-methylmorpholine-N-oxide (NMMO), a solvent, by dehydration without chemical modification, filtered, and subsequently pressed through spinning nozzles. The such formed filaments, after passing an air gap, are precipitated in a bath with an aqueous NMMO-solution and are subsequently cut to staple fibers.

Removing foreign matters in a residue-free manner is elaborate both in the lyocell-method and in the viscose-method.

SUMMARY

It is an object of the present invention to manufacture cellulose products with a flexibly adjustable functionality in an efficient manner.

This object is solved by the subject-matters according to the independent patent claims. Preferred embodiments result from the dependent patent claims.

According to an embodiment of the present invention, a method of manufacturing a regenerated cellulosic molded body is provided, wherein the method comprises supplying a starting material which comprises cellulose and at least one foreign matter, transferring at least a part of the starting material with at least a part of the at least one foreign matter into a spinning mass which additionally contains a solvent for solving at least a part of the cellulose of the starting material in the solvent, and extruding the spinning mass to the molded body, and subsequently precipitating in a spinning bath (or coagulation-bath), wherein thereby the molded body is obtained, wherein the molded body comprises cellulose and at least a part of the at least one foreign matter.

According to an embodiment of the present invention, a method of manufacturing a molded body which comprises cellulose is provided, wherein in the method a starting material is supplied which comprises cellulose and at least one (in particular non-cellulosic) foreign matter, at least a part of the starting material with at least a part of the at least one foreign matter is transferred in a solvent, to thereby (in particular directly) solve at least a part of the cellulose of the starting material in the solvent (in particular by dehydration without chemical modification), and subsequently at least a part of the cellulose is precipitated by diluting the at least partially solved starting material, wherein thereby the molded body (for example a fleece or nonwoven) or a preform of the molded body is obtained, wherein the molded body or the preform comprises cellulose and at least a part of the at least one foreign matter (in particular for providing a function of the molded body or the preform) of the starting material.

According to a further embodiment, a starting material which comprises cellulose and at least one foreign matter is used for manufacturing a molded body by the lyocell-method, wherein the molded body contains cellulose and at least a part of the at least one foreign matter.

In the context of this application, the term "cellulose" may in particular denote an organic compound which is a component of plant cell walls or can be manufactured synthetically. Cellulose is a polysaccharide (i.e. a multiple sugar). Cellulose is unbranched and typically comprises multiple hundred up to ten thousands β-D-glucose molecules (β-1, 4-glycosidic linkage) and cellobiose-units, respectively. From cellulose molecules, cellulose fibers are built by plants in a controlled manner. By means of a technical process, cellulose molecules can be agglomerated under formation of regenerated fibers, for example as tearproof fibers.

In the context of this application, the term "molded body" may in particular denote a two-dimensional or three-dimensional geometric body which is a result of a method of manufacturing and recovery, respectively, of cellulose. In particular, a two-dimensional or three-dimensional object which comprises cellulose or consists of it and is manufactured from solved pulp may be denoted as molded body. Molded bodies may be in particular lyocell-molded bodies, viscose-molded bodies or modal-molded bodies. Typical molded bodies are filaments, fibers, sponges and/or films. Basically, all types of cellulose molded bodies are suitable for embodiments of the invention. Both endless filaments and cut staple fibers with conventional dimensions (for example 38 mm length) and short fibers are considered as fibers. For manufacturing fibers, both methods with withdrawing devices downstream of one or more extrusion nozzles and also other methods, as in particular melt-blowing-methods, are possible. Alternatively to fibers, a foil which comprises cellulose can be manufactured as molded body, i.e, a planar and substantially homogenous film with or made of cellulose. Foils may be in particular manufactured by adjusting the process parameters of a lyocell-method such that coagulating is at least partially triggered only after the filaments impinge on a receiving surface. Planar cellulose molded bodies are considered as foils, wherein the thickness of these foils is adjustable (for example by selecting a number of serially arranged nozzle beams). Other embodiments of a molded body are a tissue and a fleece made of cellulose filaments and cellulose fibers, respectively, in particular a spinning fleece made of integrally merged ("merging") substantially continuous cellulose filaments ("melt blown"). Here, in particular a textile planar structure made of at least two (preferably orthogonal or almost orthogonal) crossed thread systems (or fiber systems) may be considered as a tissue, wherein threads (or fibers) in longitudinal direction may be denoted as warp threads and threads (or fibers) in a transverse direction may be denoted as weft threads. A fleece or nonwoven may be denoted as disordered (in particular present in random orientation) structure of filaments or fibers or cut yarn with limited length which are joined together to a fiber layer or a fiber web and which are connected to each other (in particular in a frictionally engaged manner). A molded body may also be created in the form of a sphere. As molded body, also cellulose-comprising particles, as in particular beads (i.e. a granulate and spherules, respectively) or flakes may be provided which can be further processed in this form. Thus, possible cellulose molded bodies are also particulate structures as granulate, spherical powder or fibrids. A shaping of a molded body is preferably performed by extrusion of a spinning solution which contains cellulose through an extrusion nozzle, since large amounts of cellulose molded bodies with a very uniform shape can be manufactured in this way. A further possible cellulose molded body is a sponge or, more general, a porous molded body. According to exemplary embodiments, the mentioned molded bodies can be used for manufacturing yarns, textiles, gels or composite materials, for example.

In the context of this application, the term "lyocell-method" may in particular denote a method of manufacturing cellulose according to a direct solvent method. The cellulose for the lyocell-method can be obtained from a starting material which contains said cellulose. In the lyocell-method, the starting material can be solved in a suitable solvent (in particular comprising tertiary amine oxides, such as N-methylmorpholine-N-oxide (NMMO) and/or ionic liquids, i.e. low-melting salts made of cations and anions). Solving may be performed in particular by dehydration and/or without chemical modification. The obtained solution, which may be also denoted as dope or spinning solution, may subsequently be pressed through one or more spinning nozzles in the lyocell-method. Thereby formed filaments can be precipitated during and/or after their free or controlled fall through an air gap in a water containing bath (in particular in a bath with aqueous NMMO-solution) and/or in the air humidity present in the air gap.

In the context of this application, the term "viscose-method" may in particular denote a method of manufacturing cellulose according to a wet spinning method. The cellulose for the viscose-method can be obtained from a starting material (in particular wood or a wood pulp) which contains said cellulose. In subsequent process stages in the viscose-method, the starting material can first be treated with a base (for example caustic soda), whereby alkali cellulose is formed. In a subsequent conversion of said alkali cellulose with carbon disulfide, cellulose-xanthagonate is formed. From this, by a further supply of a base (in particular caustic soda), a viscose-spinning solution can be produced which can be pressed through one or more spinning nozzles. In a spinning bath, viscose-filaments are generated by coagulation.

In the context of the present application, the term "foreign matter" denotes in particular at least one non-cellulosic material which, additionally to the cellulose, remains in the manufactured molded body (in particular attached to and/or embedded in cellulose fibers and/or arranged between cellulose fibers). Here, it may be such a concentration or amount of foreign matter which is a above a—as understood by a person skilled in the art—unavoidably remaining of minimal traces of non-cellulosic substances in the molded body. The one or more foreign matters may in particular at least partially be non-cellulosic fibers, for example fibers of synthetic plastic (for example made of polyester and/or elastane) which remain in the molded body. The at least one foreign matter which remains in the molded body may alternatively or additionally contain other constituents which are already contained in the starting material for manufacturing the molded body, for example remains of buttons or seams or colorants originating from the starting material. Here, in particular the concentration and amount, respectively, of the one or more foreign matters which are remaining in the molded body may be selected to be higher than a value which, by methods for removing such foreign matters, unavoidably remains as traces in the molded body during performing the manufacturing method of manufacturing the molded body. In other words, the one or more foreign matters which origin from the starting material and remain in the molded body may be retained in the molded body with an intentionally increased amount with respect to unavoidable remains. The amount of the one or more foreign matters which are remaining in the molded body may be selected such that the at least one foreign matter which is remaining in the molded body is present there in such a concentration and amount, respectively, that, when using the molded body or a product manufactured therefrom, it comes functionally into effect, therefore provides a function of the molded body or the product manufactured therefrom which is not achievable without the respective foreign matter.

According to an exemplary embodiment of the invention, a starting material is converted by the lyocell-method to a molded body which comprises cellulose. Moreover, however, during this manufacturing method, at least a part of one or more of such foreign matters is intentionally remained in the molded body, which molded body contains at least one foreign matter (preferably already present in the starting material). While conventionally a removal of foreign matters up to the technically absolutely achievable minimum was aspired, an exemplary embodiment of the invention accomplishes a paradigm shift in this respect and intentionally retains a certain concentration of at least one foreign matter in the finished manufactured molded body or a product which is manufactured therefrom by further processing, in order to influence, generate or cause a corresponding function in the molded body and the product, respectively, by means of this at least one foreign matter. In other words, the process flow according to an exemplary embodiment is adapted with advantage, such that a sufficient residual concentration (above a technically achievable minimum concentration) of the at least one foreign matter remains in the molded body or a product manufactured therefrom. In this way, an additional function of the molded body or product can be achieved which would not or not in this extent be achieved without the foreign matter. In this way, a simple process flow can be combined with an improved functionality of a manufactured cellulose-molded body. The simplified manufacturing method results from the fact that no elaborate technical measures have to be taken in order to bring the foreign matter concentration to a technically absolutely achievable minimum. The increased functionality can be achieved by the fact that one or more foreign matters in the manufactured molded body impart an additional function to the molded body or a product manufactured therefrom, or amplify such a function which would not be achievable without the sufficiently high concentration of the foreign matter. Furthermore, exemplary embodiments expand the application possibilities of starting materials for the lyocell method by the fact that, unlike in conventional approaches, also such starting materials can be used for the lyocell-method which comprise a substantial amount of non-cellulosic foreign matters. For example, also post-consumer-old clothes can be utilized which have already been used by a consumer and, in addition to cellulose, may contain a plurality of foreign matters in high concentration. According to an embodiment, it is dispensable to remove the entire large amount of foreign matters from such a starting material, since according to an embodiment, at least a part of such foreign matters can be retained in the molded body for functionalizing the manufactured molded body. Thereby, the recyclability of cellulosic wastes is improved and a resource-saving and a sustainable handling of recyclable starting materials is improved.

In the following, additional embodiments of the method and the use are described.

According to an embodiment, the spinning bath in particular contains a mixture of water and solvent. The extruded spinning mass coagulates in the spinning bath, since the amount of solvent is lower and therefore the cellulose is not within the narrow solubility window in the solvent. The molded body may be a fiber, a foil or a micro-bead, for example. From the molded body, a product can then be manufactured, for example a yarn, a tissue, etc.

According to an embodiment, the precipitating may be caused by diluting the starting material which is solved in the spinning mass by an aqueous environment in the spinning bath. In particular, the spinning bath may be a water bath, further in particular consisting of water or a mixture of water and solvent (in particular NMMO). Descriptively, in the lyocell-method, by means of the water (in particular a liquid bath with water and optionally a solvent), the concentration of the solvent which has caused the cellulose to solve, is so significantly reduced, that the obtained diluted solution sinks below the solubility limit of cellulose and the cellulose therefore precipitates and deposits, respectively. The coagulation medium (i.e. in particular the water bath) may substantially be pure water or may be provided with a solvent.

According to an embodiment, the method may comprise at most partially, and exactly partially, respectively, removing (i.e. a part is removed and another part remains) at least one of the at least one foreign matter. In more detail, the method may comprise only exactly partially removing at least one of the at least one foreign matter by separating only exactly one part of the at least one foreign matter from the cellulose of the starting material (in particular prior to precipitating, further in particular prior to solving). According to such an embodiment, the process flow is adjusted during the lyocell-method such that intentionally not the entire removable amount of foreign matter is removed from the starting material, in order to manufacture cellulosic molded bodies from it, but by instead performing an adjustment of the process parameters of a manufacturing device, such that more than only unavoidable traces of foreign matters of the starting material remain in the manufactured molded body. For example, certain procedures for removing foreign matters may be completely or partially omitted, for example the manufacturing method can be performed without bleaching step for removing colorants. Furthermore, it is possible to configure a filter (in particular to dimension openings in the filter) which filters a lyocell-spinning solution prior to spinning and therefore frees it from foreign matters, such that a certain amount of foreign matters (for example foreign matters with a size below a threshold size, up to which a filter retains particles from spinning nozzles) remains in a lyocell-spinning solution and consequently in the finished manufactured molded body. Moreover, it is for example possible to completely omit performing of separation steps for separating certain foreign matters or to perform such separation steps in limited or reduced manner. In this way, one or more foreign matters remain in the manufactured molded body with an adjustable target concentration (in particular above an unavoidable minimum concentration).

According to an embodiment, the starting material may comprise or consist of a cellulose source to be recycled, it may be in particular completely or partially made of remains of a clothing manufacture and/or of old clothes. In the context of this application, the term "cellulose source" may in particular denote a medium (in particular a solid body medium) which, as basis for manufacturing a molded body which comprises cellulose, during a corresponding manufacturing method, provides the cellulose material used for this purpose. An example is wood and wood pulp, respectively. Since according to an exemplary embodiment, certain amounts of at least one foreign matter in the manufactured molded body are intentionally utilized for providing an additional function of the manufactured molded body, the spectrum of starting materials for the lyocell-method can be increased. Namely also such starting materials can access the lyocell-method, which are not for the first time taken from a natural resource, such as wood, but origin from an already used product. Especially advantageous in this context is the use of post-consumer-old clothes after a use by a consumer, since such old clothes comprise a large reservoir of cellulose to be recycled on the one hand and functionalizable foreign matters on the other hand (for example synthetic plastics such as polyester or elastane, colorants, etc.).

In the context of this application, the term "remains from a clothing manufacture" may in particular denote waste and/or offcut of a textile or yarn which comprises or consists of cellulose, wherein said remains occur during a method of manufacturing clothes. In manufacture of clothing, for example a textile which comprises cellulose is manufactured as starting material, from which planar parts (for example in form of a half T-shirt) are cut. Remains are left, which can be resupplied to a method of manufacturing a molded body which comprises cellulose, according to an exemplary embodiment. Thus, remains from a clothing manufacture may be a starting material which comprises or consists of cellulose, which can be used for recovering cellulose before a consumer has used the remains as clothes or in another way. In particular, the remains from a clothing manufacture may be made of substantially pure cellulose, in particular without foreign matters which are separate and do not comprise cellulose (as buttons, textile print or seams, for example).

In the context of this application, the term "old clothes" may denote clothes, in particular comprising cellulose, which have been already used (in particular worn) by a user when at least a part of the cellulose is recovered. Thus, old clothes may be a starting material comprising cellulose which may (but does not have to) comprise a substantial amount of foreign matters and which may be used for recovering cellulose, after a user has used the old clothes as clothing or in any other way. In particular, old clothes may be made of a mixture of cellulose and one or more foreign matters, in particular comprising (in particular frequently used in clothing) synthetic plastic (such as polyester and/or elastane, for example) and/or foreign matters which are separate and do not comprise cellulose (such as buttons, textile print or seams). Polyester may in particular denote polymers with ester functions (R—[—CO—O—]—R) in their main chain. Polycarbonates and polyethylene terephthalate belong to polyesters. Elastane in particular denotes an extensible chemical fiber with a high elasticity. A block copolymer which is underlying elastane may contain 85% by weight polyurethane.

According to an embodiment, the at least one foreign matter may comprise at least one of a group which is consisting of a colorant, an optical brightener, a matting agent (in particular $TiO_2$) and an antimicrobial substance (in particular zinc oxide). When such a colorant remains in the molded body, which colorant was already contained in the starting material, an additional coloration of the manufactured molded body may be dispensable. An optical brightener which was already contained in the starting material may also be reused in the manufactured molded body, such that the degree of recycling may also be increased in this respect. An antimicrobial substance, such as zinc oxide, may also be transferred from the starting material in the finished manufactured molded body and may there suppress or even eliminate an undesired growth of bacteria or the like. This is advantageously in particular for the use of the manufactured molded body for such products which can get in contact with the body of a user (for example recycled clothes or medical products and cosmetic articles).

According to an embodiment, the at least one foreign matter may comprise elastane which, during solving the cellulose, is also at least partially solved. Elastane is used in many textiles, in particular clothes, further in particular old clothes, and can be intentionally retained as foreign matter in the molded body which comprises cellulose. It has turned out that elastane in a recycled cellulose-molded body does not disturb and thus does not have to be elaborately removed from the starting material up to a maximum achievable limit, when a molded body is manufactured. It is even possible, by means of retaining elastane in a cellulosic molded body, to impart a certain elasticity to the latter. In this way, also molded bodies with elastic properties can be manufactured.

According to an embodiment, the at least one foreign matter may comprise polyester which is at least partially retained in the starting material when the starting material is solved, in particular precipitated. Polyester is a foreign matter which is frequently found in post-consumer-old clothes. According to an exemplary embodiment, at least a part of this polyester may remain in the manufactured cellulose-molded body. Descriptively, such a residue of polyester in the molded body may function similar as a hot melt adhesive and can mechanically strengthen a fiber tissue and a fiber fleece, respectively, made of cellulose. Thereby, by at least partially retaining polyester in the cellulose-molded body, a mechanically especially robust cellulose material can be generated which therefore can also be provided with thermoplastic properties. According to such an embodiment, the additional function which is provided by the foreign matter can be seen in an increased mechanical robustness and stability, respectively, of the manufactured molded body.

According to an embodiment, the method may comprise at least partially removing non-cellulosic fibers from the starting material prior to precipitating, in particular prior to solving. Such fibers may either be completely removed or may be partially retained in the molded body. In particular post-consumer-old clothes to be recycled frequently comprise a substantial amount of fibers which are not made of cellulose. Examples for these are polyester fibers. By, according to an exemplary embodiment, retaining such fibers during the method of manufacturing cellulose-molded bodies (in particular cellulose-fibers) as mixed fibers additionally to the cellulose fibers, separating methods can be completely or partially omitted and molded bodies with mixed properties made of cellulose fibers and synthetic fibers can be obtained. With advantage, such non-cellulosic fibers may be partially removed in the method of manufacturing the molded bodies and partially retained therein. By taking this measure, the functionality of the at least one foreign matter which remains in the molded body with an adjustable amount can be adjusted by a user.

According to an embodiment, the method may comprise at least partially, in particular completely, removing metals from the starting material. Metals which are optionally contained in the starting material may be completely or partially removed with advantage, for example to avoid an allergic reaction when coming into contact with the skin of the user (for example nickel). Alternatively, one or more metals can also be retained in the molded body. For example, silver from the starting material may have an antimicrobial effect in the recycled molded body. In order to adjust the extent of the functionality of the at least one foreign matter which remains in the molded body, a part of the metals as foreign matters may be removed from the starting material.

According to an embodiment, in the method, the molded body which comprises cellulose may be manufactured without performing a bleaching procedure. By omitting the performance of a bleaching procedure, colorants in a starting material can also be supplied to the recycling process and thereby the recycling rate may be increased. This improves the sustainability and the resource efficiency during performing the lyocell-method. When a bleaching method is omitted, a presorting of the starting material in different color groups may be optionally performed with advantage.

According to an embodiment, prior to solving, the starting materials can be presorted by colors in multiple color groups and (for example in a respective charge) respectively only starting material of a common color group may be solved. By presorting the starting material, in particular old clothes and/or remains from the clothing manufacture, a respective starting material which belongs to a respective color group can be supplied to the lyocell-method while at least partially retaining its colorants and can be retained in the manufactured molded body. For example, a sorting of the starting material in the color groups red, green, blue, yellow, black, white, and other remaining colors may be performed. As result of this presorting, the obtained molded body is not obtained with an indifferent gray tone or brown tone, but may comprise a color tone which corresponds to or is at least similar to the presorted color tone. A presorting of a starting material by color groups may be accomplished completely automatically, for example based on an optical recognition of the supplied starting material and a correspondingly performed machine-controlled sorting. As result of the presorting, colorants which are contained in the starting material do not have to be considered as disturbing foreign matters anymore, but may impart the function of the respective coloration to the manufactured molded body.

According to an embodiment, the portion of the at least one foreign matter (in particular a total amount of non-cellulosic foreign matters in the molded body or the preform) which is present in the molded body or the preform, may be at least 0.01 weight percent, in particular at least 0.1 weight percent, further in particular at least 1 weight percent, still further in particular at least 10 weight percent, respectively with respect to the total weight of the molded body or the preform. The mentioned ranges of weight percents of one or more foreign matters in the molded body may be retained alone or commonly in the molded body for each of the here described foreign matters (in particular a colorant, a synthetic plastic, such as polyester or elastane, an antimicrobial substance, such as zinc oxide or silver, an optical brightener, non-cellulosic foreign fibers, etc.). With the mentioned ranges, a sufficient functionalization of the molded body with one or more foreign matters is enabled.

In particular, a portion of polyester, which is present in the molded body or the preform, which originates from the starting material, as foreign matter may be at least 0.001 weight percent, in particular at least 0.01 weight percent, further in particular at least 1 weight percent, with respect to the total weight of the molded body or the preform. Alternatively or in addition, a portion of elastane, which is present in the molded body or the preform, which originates from the starting material, as foreign matter may be at least 0.001 weight percent, in particular at least 0.01 weight percent, further in particular at least 1 weight percent, with respect to the total weight of the molded body or the preform. Alternatively or in addition, a portion of colorant (in particular indigo-colorant of denim-textiles), which is present in the molded body or the preform, which originates from the starting material, as foreign matter may be at least 0.001 weight percent, in particular at least 0.01 weight percent, further in particular at least 1 weight percent, with respect to the total weight of the molded body or the preform. Alternatively or in addition, a portion of metal oxide which is present in the molded body or the preform, which originates from the starting material, as foreign matter may be at least 0.001 weight percent, in particular at least 0.01 weight percent, further in particular at least 1 weight percent, with respect to the total weight of the molded body or the preform. Alternatively or in addition, a portion of antimicrobial substance which is present in the molded body or the preform, which originates from the starting material, as foreign matter may be at least 0.001 weight percent, in particular at least 0.01 weight percent, further in particular at least 1 weight percent, with respect to the total weight of the molded body or the preform. According to an exemplary embodiment, lyocell-fibers, after spinning, may comprise 0.004 weight percent to 0.01 weight percent or more contaminants.

According to an embodiment, the method may comprise comminuting, in particular mechanically comminuting, further in particular shredding, the starting material prior to solving the starting material in the solvent. For example, by comminuting, a reduction of the size of the starting material to a fiber-size may be performed. In particular, a such prepared starting material can be directly transferred in solution without chemical pretreatment, in order to generate a high-viscosity spinning mass.

According to an embodiment, the starting material, prior to its precipitating (preferably already prior to its solving) may be at least partially freed from cross-linkers which are cross-linking fibers of the starting material. This may be performed by an alkaline and/or acid pretreatment, for example, in particular dependent from the type of the present cross-linkers. A lyocell-fiber is a fibrillating fiber which can be cross-linked with molecules. A corresponding cross-linker may disturb, since it may reduce the solubility of lyocell-cellulose in thelyocell-solvent. The at least partial removal of the cross-linker by means of a pretreatment (for example by performing an alkaline step and/or an acid step) under partially or completely solving the undesired cross-linking, may increase the purity of the obtained cellulose.

According to an embodiment, the starting material, prior to its precipitating (in particular prior to its solving in the solvent) may be combined with another cellulose source. For example, the other cellulose source may comprise at least one material of a group which is consisting of wood pulp, rags pulp (in particular pulp made of a textile remains, such as linen, rags, etc.), cotton (i.e. cellulose from a cotton plant, see FIG. 5), cellulose manufactured by a lyocell-method (see FIG. 3), and cellulose manufactured by a viscose-method (see FIG. 4). The starting material may also be an inhomogeneous mixed tissue. The other cellulose source may be added flexibly and according to availability. Thereby, the industrial utilization of the lyocell-method is not impaired by possible temporal bottlenecks of a certain cellulose source. Instead, it is for example possible to compensate and balance out, respectively, possible missing quantities of old clothes-cellulose by another cellulose source. Preferably, forming the starting material may be exclusively from old clothes.

According to an embodiment, solving the starting material and/or solving the cellulose source may be performed by a direct solving method. Preferably, tertiary amine oxides are utilized, especially preferred N-methylmorpholine-N-oxide (NMMO).

According to an embodiment, the method may comprise a postprocessing of the molded body. Such an optional postprocessing may for example comprise drying, impregnating, and/or reshaping of the obtained cellulose-filaments. By a corresponding postprocessing, it is possible to finish the molded body manufacturing at the end of the lyocell-method in an application-specific manner.

According to an embodiment, the at least one selectively retained foreign matter in the molded body may be used to use a function of the at least one foreign matter for the molded body. In the context of the present application, the term "function" of the foreign matter in a molded body in particular denotes a technical function (such as thermoplastic properties, elastic properties, coloring or optical brightening, antimicrobial properties) which is only comprised by the molded body with the foreign matter, but not without the foreign matter. Such a function may in particular be generating an effect or increasing an effect.

According to an exemplary embodiment, the method of manufacturing the molded body may be performed such that, based on a control command, an amount of the at least one foreign matter, which is remaining in the manufactured molded body, is adjusted in a user-defined manner, in particular is adjusted to be higher than a minimum value which is achievable in terms of process technology. In this way, it is possible for a user to adjust the extent of the remaining concentration of the at least one foreign matter in the molded body flexibly and with respect to the desired functionality of the obtained molded body.

According to an exemplary embodiment, the method may comprise receiving a user-sided signal for defining a target-function of the molded bodies to be manufactured, and adjusting process parameters for adjusting an amount of one or more foreign matters which are to be retained in the molded body for achieving the target function. For this purpose, based on a control command of a user, a database in which functions are stored which correspond to single foreign matters, one or more foreign matters can be selected which are suitable for achieving the target function. After the determination of the desired amount of such an at least one foreign matter, the at least one process parameter may be adjusted, such that the desired function is achieved. Possible process parameters in this context are an adjustment of a mechanical comminuting method, an adjustment of a chemical cleaning method, the adjustment of a possible bleaching method, the adjustment of a filtering of the lyocell-spinning solution prior to spinning filaments, the adjustment of a possible process for physically separating constituents of a starting material, a washing method, etc.

The molded bodies manufactured according to the invention, may be used as packaging material, fiber material, textile composite materials, fiber composite materials, fiber fleeces, needle felts, quilting cotton, tissues, knitted fabrics, home textiles such as bedclothes, as clothes, as filling agent, flocking substance, hospital textiles such as underlays, diaper or mattresses, as fabric for heating blankets, shoe inserts and wound dressings, for example. Embodiments of the invention may be applicable in both different technical fields and in medicine and in cosmetics and wellness. In medicine, for example materials for wound treatment and wound healing may be made of a carrier which determines the mechanical properties and a biocompatible coating material which is especially compatible with the skin and with the surface of the wound. Many other applications are possible.

BRIEF DESCRIPTION OF THE DRAWINGS

In the following, exemplary embodiments of the present invention are described in detail with reference to the following figures.

DETAILED DESCRIPTION

Same or similar components in different figures are provided with the same reference numbers.

Before, referring to the figures, exemplary embodiments are described, some basic considerations shall be summarized based on which exemplary embodiments of the invention have been derived.

According to an exemplary embodiment of the invention, a functionalization of recycling-residues in a molded body which comprises cellulose may be performed.

When processing recycling-materials as starting material for manufacturing lyocell-fibers, there are typically high demands with respect to said cellulosic starting material. In particular in processes for processing recycling-materials with high plastic portions, according to exemplary embodiments of the invention, completely removing of the plastics is not necessary and also not desired. It has namely turned out as advantageous to retain certain amounts of foreign matters (such as plastics) in the starting material (without completely removing them), since such small amounts of plastics and other foreign matters in the lyocell-dope and the lyocell-spinning solution, respectively, may even have positive functional properties for the lyocell-fiber. In this way, for example a certain elastane-residue in the starting material and thus also in the finished manufactured molded body, according to an exemplary embodiment of the invention, may generate a flexibility of the lyocell-fiber. A PU-residue in the fibers may advantageously lead to a thermoplastic deformability and/or an increased mechanical stability of the generated molded bodies or a product manufactured therefrom. Therefore, according to an exemplary embodiment of the invention, a complete, residue-free removal of the plastic-portions (such as polyethylene terephthalate (PET), polyamide (PA), polyurethane (PU), etc.) may be intentionally omitted, since such a complete removal is difficult and resource-intense and, due to the function which is provided by the foreign matters, is also not necessary and desired in the context of the molded bodies, as has been found according to exemplary embodiments of the invention. In particular small amounts of such foreign matters may even contribute positive properties for the lyocell-fibers and do not impair.

Figure 1:
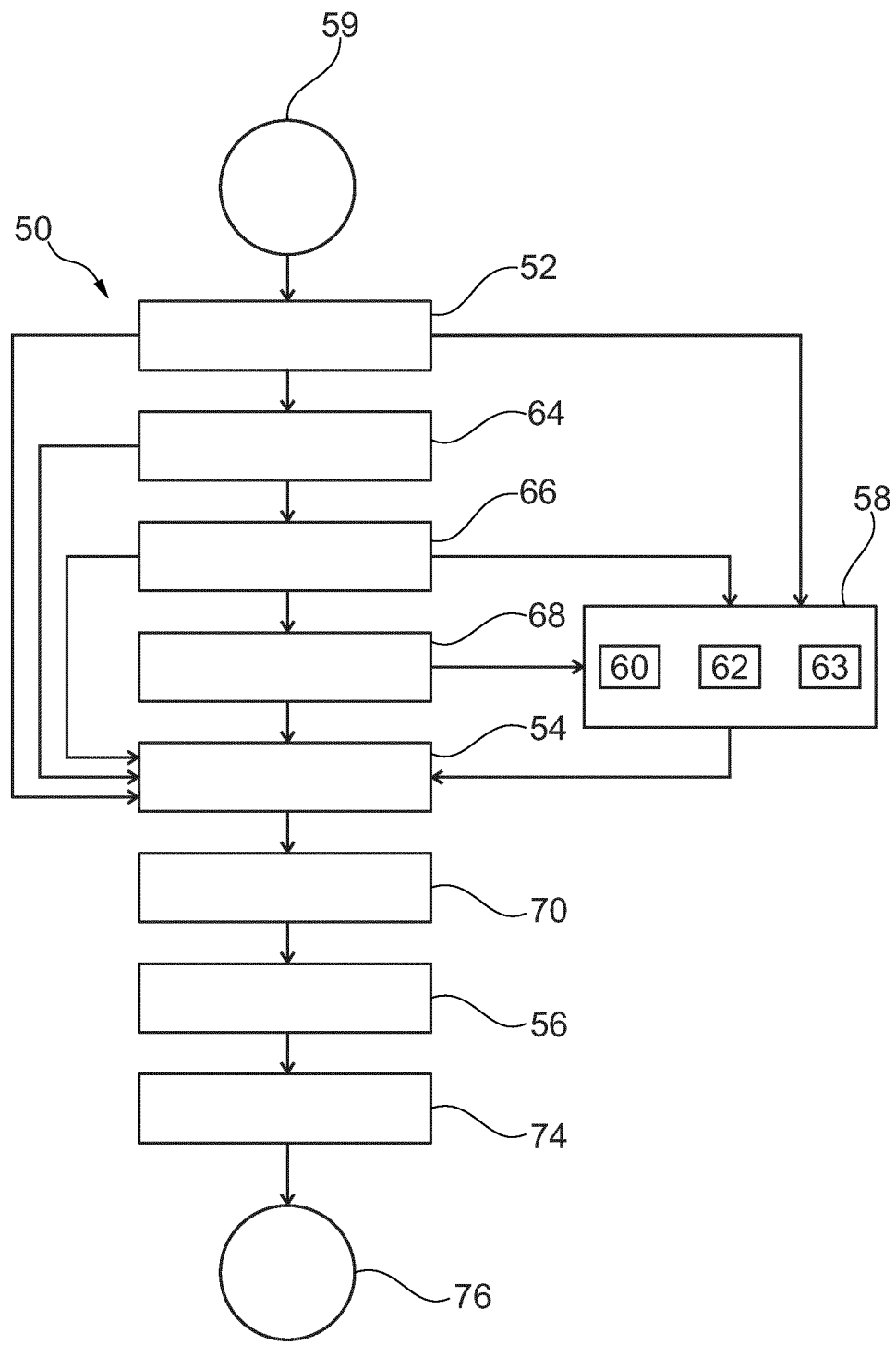
FIG. 1 shows a flow diagram of a method of manufacturing a molded body which comprises cellulose according to an exemplary embodiment of the invention.

FIG. 1 shows a flow diagram 50 of a method of manufacturing a cellulose-comprising and regenerated cellulosic, respectively, molded body 102 (compare FIG. 2) according to an exemplary embodiment of the invention.

As starting material 110 (compare FIG. 2), clothing which has been already worn by a user and are not required anymore, therefore post-consumer-clothes, may be used, which comprise the cellulose. In other words, prior to the beginning of the method of manufacturing the molded body 102 which comprises cellulose, the starting material 110 may be already used by a consumer, see reference sign 59. Here, the cellulose can be present as textile tissue, for example, in particular using further constituents (for example synthetic plastics such as polyester and elastane). When the consumer disposes the article of clothing, it can be used as post-consumer starting material 110 for a lyocell-method illustrated in FIG. 1, which is described in more detail in the following. Alternatively or in addition, it is also possible to use a pre-consumer starting material 110 which is comprising cellulose for such a lyocell-method, for example offcut remains from a clothing manufacture.

Thus, as illustrated with reference sign 52, the starting material 110 is supplied to the lyocell-method, wherein the reused and recycled, respectively, textile starting material 110 comprises cellulose and in addition various foreign matters. The cellulose and the foreign matters of the starting material 110, when being supplied 52, may be present in a common solid body composite (for example as textile planar structure, fiber composite or solid body composite), i.e, may be part of one or more bodies (for example clothes or offcut remains) or particles (for example shredded or milled clothes or offcut) in the solid body phase. Thus, in such a solid body and solid particles, respectively, a mixture of the cellulose and the foreign matters may be present which therefore may be integrally connected with each other. Thus, the starting material 110 constitutes a cellulose source 154 to be recycled which may be completely or partially made of remains from a clothing manufacture and/or of old clothes. The foreign matters contained therein may comprise a colorant, an optical brightener, and an antimicrobial substance, such as zinc oxide, etc. Furthermore, in the starting material 110, elastane as further foreign matter can be contained, which may also be at least partially solved during a solving 54 of cellulose which is described below. Such elastane is frequently contained as additional fiber in clothes, to impart elasticity to the clothes. As additional foreign matter, the starting material 110 may also comprise polyester which remains at and in, respectively, the cellulose during solving 54 and subsequently precipitating 56.

In the following, it is described how on basis of the starting material 110 which comprises cellulose, molded bodies 102 made of lyocell-cellulose and foreign matters which have not been removed, can be manufactured according to an embodiment of the invention. For this purpose, the starting material 110 is supplied to a device 100 (see FIG. 2) for performing a lyocell-method, compare reference sign 52.

At first, the starting material 110 may optionally be presorted by color in multiple color groups (see reference sign 64), for example in multiple color-specific color groups (such as blue, red, green, yellow, black, and white) and in a remaining group with color-unspecific starting material (for example multicolored textiles). This has the advantage that subsequently respectively only starting material 110 of a common color group is solved (see reference sign 54) and thus colorants of a uniform or at least substantially uniform color are utilized for a characteristic coloring of the manufactured molded bodies 102. Forming diffuse and uncharacteristic mixed colors in the manufactured molded bodies 102 may be thereby avoided, and the colorant which was conventionally classified as undesired foreign matter, may be recycled in the manufactured molded bodies as functional colorant. With advantage, supplying a separate colorant for coloring the molded bodies 102 or products manufactured therefrom, may then be dispensable or only be necessary to a reduced amount. When, after the presorting 64, the colorant of one color group remains in the starting material 110 and determines the coloring of the manufactured molded bodies 102, the molded body 102 which comprises cellulose can be manufactured without performing a bleaching procedure, therefore simply and ecologically.

Prior to or after the presorting 64, an optional but advantageous mechanically comminuting 66 of the starting material 110 by shredding may be performed. Thereby, a part of mainly large, non-cellulosic, impurities can be removed from the starting material 110, for example buttons, seams and prints of the old clothes which have been at least partially used for generating the starting material 110. By mechanically comminuting 66, the starting material 110 may be separated to single fibers, for example.

Optionally, it is also possible (see block 68) to utilize the starting material 110 which comprises cellulose commonly with other materials which comprise cellulose (see further cellulose source 156 in FIG. 2) for the lyocell-method. Thus, the starting material 110 can be mixed with another starting material which comprises cellulose, see block 68. Thus, the starting material 110 may also comprise another material which comprises cellulose, for example wood or pulp extracted therefrom. It is also possible to mix the starting material 110 to be recycled with a further starting material 110 which comprises cellulose. The latter may comprise rags pulp of textiles, cotton of a cotton plant, cellulose recovered from a viscose-method and/or cotton linters (i.e. substantially shorter cotton strains with respect to cotton lint which have approximately 38 mm length, for example, as they grow at the seed of a cotton plant), for example. The portion of old clothes of the starting material 110 may be for example between 3 weight percent and 100 weight percent, in particular between 10 weight percent and 80 weight percent. It is especially preferred when this portion is 100 weight percent.

The method may further comprise an optional, but advantageous, only exactly partial removing 58 of one, multiple, or all of the foreign matters. This removing 58 may be performed directly after supplying 52 or after comminuting 66 or after mixing 68. It is also possible to omit the procedure of removing 58 and to continue with a solving 54 of the starting material 110 directly after supplying 52, after presorting 64, after comminuting 66, or after mixing 68.

When the procedure of removing 58 is performed, it may comprise partially or completely removing 60 non-cellulosic fibers from the starting material 110, for example when the presence of elastane fibers or polyester fibers in the finished manufactured molded body 102 is not desired. Alternatively or in addition, the procedure of removing 58 may comprise partially or completely removing 62 metals from the starting material 110, if the presence of metals in the molded body 102 is not desired. Furthermore, in the context of removing 58, the starting material 110 may be completely or partially freed from cross-linkers which are cross-linking fibers of the starting material 110 (see reference sign 63). If such a separation of single fibers is desired, a cross-linker (dependent from its chemical nature) may be removed by an alkaline and/or an acid pretreatment, for example. However, according to an exemplary embodiment of the invention, after removing 58, always a certain adjustable portion of foreign matters remains in the starting material 110 to be subsequently solved.

Directly after supplying 52, directly after presorting 64, directly after mechanically comminuting 66, directly after mixing 68, or directly after removing 58, directly solving the (pure and mixed, respectively) starting material 110 in a solvent 116 (for example tertiary amine oxides, such as N-methylmorpholine-N-oxide (NMMO)), advantageously without chemical pretreatment, may be performed. Such a solving 54 may be performed by transferring the starting material 110 (commonly with the foreign matters contained therein) in a solvent 116, whereby a spinning mass is formed. In more detail, the starting material 110 which is pretreated as described, may in particular be directly transferred in solution, also without chemical cleaning and without adjusting the viscosity. In this way, the manufacturing method and recycling method, respectively, may be performed in an extraordinary simple and fast and ecological manner. It has surprisingly turned out that after the described pretreating, foreign matters (for example polyester and elastane, respectively) which are remaining in the starting material 110, do not disturb the lyocell-method and do not negatively influence the quality of the recovered lyocell-cellulose. In contrast, certain amounts of elastane may remain in the manufactured cellulose fibers without deteriorating their properties. Also certain amounts of remaining polyester do not disturb the obtained product, but may even strengthen the mechanical integrity of the molded body 102 to be manufactured.

After solving 54 the starting material 110 in solvent (preferably NMMO), the obtained lyocell-spinning solution may be pressed through one or more spinning nozzles, whereby threads and filaments, respectively, with honey-like viscosity are generated (see block 70 concerning this spinning and extruding, respectively).

During and/or after the falling of these threads and filaments, respectively, these are brought in operational connection with an aqueous environment and are therefore diluted. Thereby, the concentration of the solvent 116 of the threads and filaments, respectively, is reduced in an aqueous liquid bath to such an extent that the lyocell-spinning solution is transferred to a solid phase made of cellulose-filaments. In other words, a precipitating, depositing or coagulating of the cellulose-filaments occurs, see reference sign 56. Therefore, a pre-form of the molded body 102 is obtained. Thus, extruding 70 the spinning mass to molded bodies 102 by means of precipitating 56 in a spinning bath (see reference sign 191 in FIG. 2) is performed.

Solving 54, spinning and extruding 70, respectively, and subsequently precipitating 56 by a lyocell-method is thus performed based on a starting material 110 which comprises or consists of cellulose material to be reused and to be recycled, respectively, and has to be freed from foreign matters at most partially.

Furthermore, the method may comprise postprocessing 74 the precipitated lyocell-cellulose for obtaining the molded body 102 from the preform of the molded body 110. Such a posttreatment may for example encompass drying, impregnating and/or reshaping the obtained filaments to the final molded body 102. For example, the molded body 102, by the described manufacturing method, may be processed to fibers, a foil, a tissue, a fleece, a sphere, a porous sponge, or beads and may then be supplied to a further use (compare reference sign 76).

The portion of the at least one foreign matter which is present in the molded body 102 or the preform, may be at least 0.1 weight percent, with respect to a total weight of the molded body 102. The remains of the foreign matters which are retained in the molded body 102 in a targeted and intentional manner may be used to use a function of the respective foreign matter in the context of the use of the molded body 102 or a product manufactured therefrom. The elastane-foreign matter which is remaining in a molded body 102 may be functionally used to impart elasticity to the manufactured molded body 102. A foreign matter polyester which is remaining in the molded body 102 may be functionally utilized for providing the molded body 102 with a thermoplastic deformability and for strengthening the mechanical robustness of the molded body 102, respectively, and the product manufactured therefrom.

With the method corresponding to the flow diagram 50 according to FIG. 1, it is thus possible to provide a manufacturing method for manufacturing molded bodies 102, which is simple and performable with low effort, wherein the requirements to the removal of one or more foreign matters from the starting material 110 are extremely low. In contrast to conventional approaches, the described embodiment of the invention assumes that the foreign matters in the starting material 110 for manufacturing the molded bodies 102 do not completely have to be removed as disturbing in an amount as high as possible, but shall remain to a certain part in the starting material 110 and the lyocell-spinning solution 104 manufactured therefrom, in order to impart one or more desired additional functions to the manufactured molded bodies 102. These additional functions may consist of providing a color, increased elasticity, increased mechanical robustness, antimicrobial effect, etc. In particular, it is possible for a user, when performing the method according to the flow diagram 50 of FIG. 1, to influence the manufacturing method, in order to equip the molded body 102 with a desired function, which may be accomplished by adjusting the extent of the retaining of one or more foreign matters from the starting material 110 in the molded body 102.

Figure 2:
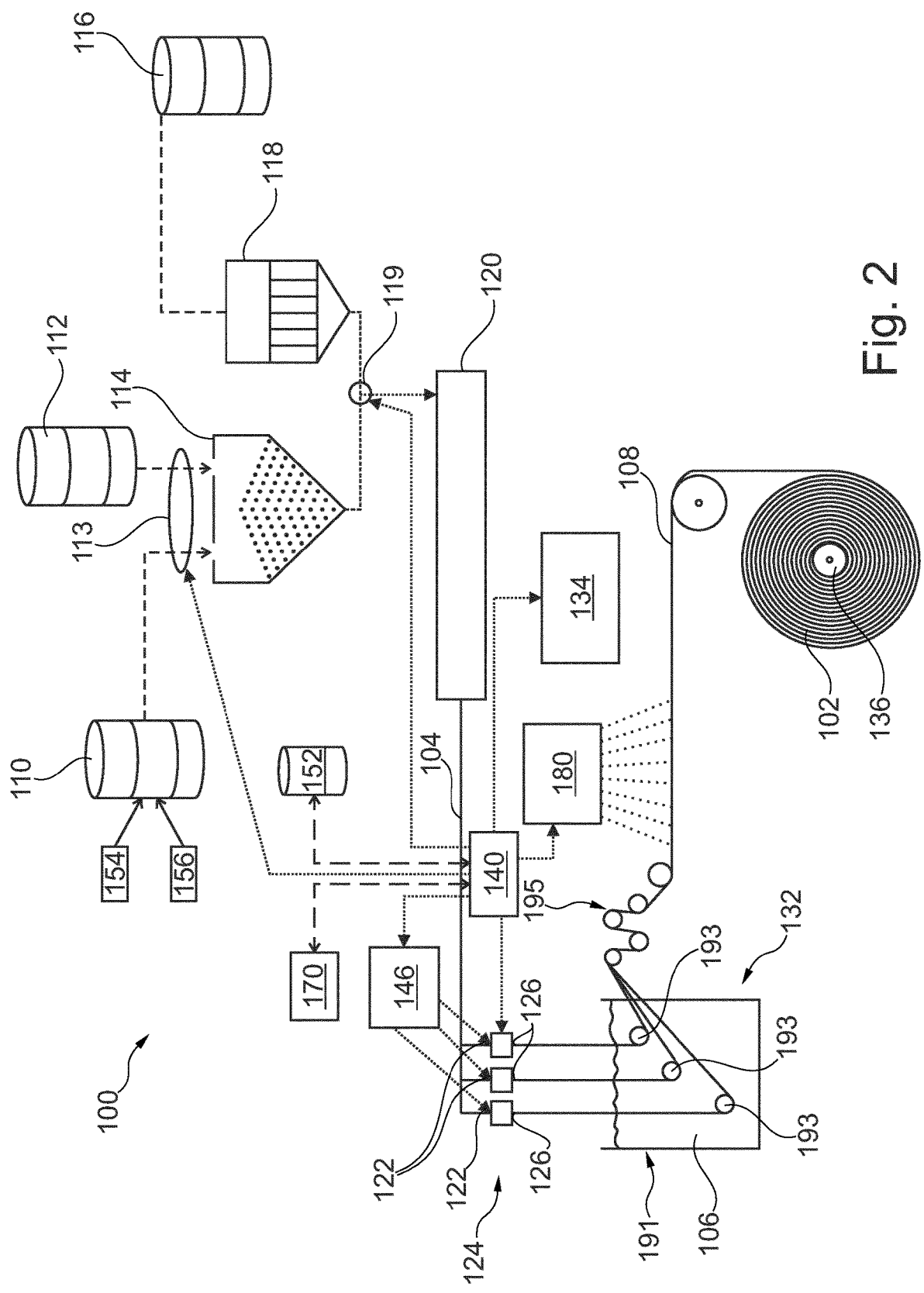
FIG. 2 shows a device for manufacturing molded body which comprises cellulose by a lyocell-method according to an exemplary embodiment of the invention.

FIG. 2 shows a device 100 for manufacturing a molding body 102 which comprises cellulose by means of a lyocell-method according to an exemplary embodiment of the invention which is described with respect to FIG. 1.

Thus, FIG. 2 shows a device 100 according to an exemplary embodiment of the invention for manufacturing a cellulose-comprising molded body 102 which may be manufactured in form of a fleece (nonwoven), as fiber, foil, sphere, textile tissue, sponge, or in form of beads or flakes, for example. According to FIG. 2, the molded body 102 is manufactured directly from a spinning solution 104. The latter is converted to cellulose fibers 108 as molded body 102 by means of a coagulation-fluid 106 (in particular made of air humidity) and/or a coagulation-bath 191 (for example a water bath which optionally comprises tertiary amine oxides such as N-methylmorpholine-N-oxide (NMMO)). By means of the device 100, a lyocell-method may be performed. In this way, substantially endless filaments or fibers 108 or mixtures of substantially endless filaments and fibers 108 with a discrete length may be manufactured as molded body 102, for example. A plurality of nozzles which respectively have one or more openings 126 (which may be also denoted as spinning holes) are provided for ejecting the lyocell-spinning solution 104.

As can be taken from FIG. 2, a starting material 110 which is based on cellulose may be supplied to a storage tank 114 via a dosing device 113.

According to an embodiment, a water ingress in the cellulose-based starting material 110 may occur by a solvent 116 (in particular NMMO) which is described in more detail below. Furthermore, the cellulose-based starting material 110 itself may contain a certain residual moisture (dry pulp frequently has a residual moisture of 5 weight percent to 8 weight percent, for example). In particular, according to the described embodiment, the starting material 110 may directly be supplied to a mixture of water and solvent 116 without pre-moistening. An optional water container 112 which is shown in FIG. 2 may then be omitted.

According to an alternative embodiment, the starting material 110 which is comprising cellulose may be additionally moistened, in order to therefore provide moist cellulose. For this purpose, water from an optional water container 112 may be supplied to the storage tank 114 via the dosing device 113. Therefore, the dosing device 113 which is controlled by a control device 140 may supply adjustable relative amounts of water and starting material 110 to the storage tank 114.

A suitable solvent 116, preferably tertiary amine oxides such as N-methylmorpholine-N-oxide (NMMO) and an aqueous mixture of the solvent 116, respectively, for example a 76% solution of NMMO in water, is contained in a solvent container. The concentration of the solvent 116 may be adjusted in a concentrating device 118 either by supplying pure solvent or water. The solvent 116 may then be mixed with the starting material 110 with definable relative amounts in a mixing unit 119. Also the mixing unit 119 may be controlled by the control unit 140. Thereby, the cellulose-comprising starting material 110 is solved in the concentrated solvent 116 in a solving device 120 with adjustable relative amounts, whereby the lyocell-spinning solution 104 is obtained. The relative concentration ranges (also denoted as spinning windows) of the components starting material 110, water and solvent 116 in the spinning solution 104 for manufacturing cellulosic regenerated molded bodies according to the lyocell-method may be suitably adjusted as known to a person skilled in the art.

The lyocell-spinning solution 104 is supplied to a fiber generating device 124 (which may be configured with a number of spinning beams or jets 122).

When the lyocell-spinning solution 104 is guided through the openings 126 of the jets 122, it is separated into a plurality of parallel threads made of the lyocell-spinning solution 104. The described process flow transforms the lyocell-spinning solution 104 to increasingly long and thin threads whose properties may be adjusted by a corresponding adjustment of the process conditions, controlled by the control unit 140. Optionally, a gas flow may accelerate the lyocell-spinning solution 104 on its way from the openings 126 to a fiber receiving unit 132.

After the lyocell-spinning solution 104 has moved through the jets 122 and further downwards, the long and thin threads of the lyocell-spinning solution 104 interact with the coagulation-fluid 106.

In the interaction with the coagulation-fluid 106 (for example water), the solvent concentration of the lyocell-spinning solution 104 is reduced, such that the cellulose of the starting material 110 at least partially coagulates and precipitates, respectively, as long and thin cellulose fibers 108 (which may still contain residues of solvent and water).

During or after the initial formation of the individual cellulose fibers 108 from the extruded lyocell-spinning solution 104, the cellulose fibers 108 are received at the fiber receiving unit 132. The cellulose fibers 108 may immerse into the coagulation-bath 191 shown in FIG. 2 (for example a water bath optionally comprising a solvent such as NMMO) and may complete their precipitation when interacting with a liquid of the coagulation-bath 191. Depending on the process adjustment of the coagulation, the cellulose may form cellulose fibers 108 (as shown, wherein the cellulose fibers 108 may be made of one substance and integrally merged with each other ("merging"), respectively, or may be present as separated cellulose fibers 108) or a foil and a film, respectively, made of cellulose may form at the fiber receiving unit 132 (not illustrated in FIG. 2).

Thus, the cellulose fibers 108 are extruded out of the spinning nozzles of the jets 122 and are guided through the spinning bath and coagulation-bath 191, respectively (for example containing water and NMMO in low concentration for precipitation/coagulation), wherein the cellulose fibers 108 are guided around a respective deflection roll 193 in the coagulation-bath 191 and are supplied to a draw-off godet 195 outside the coagulation-bath 191. The draw-off godet 195 serves for further transport and post-stretching of the cellulose fibers 108, in order to achieve a desired titer. Downstream the draw-off godet 195, the fiber bundle made of the cellulose fibers 108 is washed in a washing unit 180, optionally scrooped and subsequently cut (not shown).

Although not illustrated in FIG. 2, the solvent 116 of the lyocell-spinning solution 104 which is removed from the cellulose fibers 108 when coagulating and in a subsequent washing in the washing unit 180, may at least partially be recovered and recycled, respectively, and may be transferred back to the storage tank 114 in a subsequent cycle.

During the transport along the fiber receiving unit 132, the molded body 102 (here in form of the cellulose fibers 108) may be washed by means of the washing unit 180, as the latter supplies a washing liquid for removing solvent residues. Thereafter, the molded body 102 may be dried.

Moreover, the molded body 102 may be made subject to a posttreatment, see the schematically illustrated posttreatment unit 134. For example, such a posttreatment may comprise a hydro-entangling, a posttreatment, a needle treatment, an impregnation, a steam treatment with a steam which is supplied under pressure and/or a calendaring, etc.

The fiber receiving unit 132 may supply the molded body 102 to a winding device 136, at which the molded body 102 may be winded. The molded body 102 may then be supplied as rolling freight to an entity which manufactures products such as wipes or textiles on basis of the molded body 102.

In the lyocell-method according to FIG. 2, a user may pre-give to the control unit 140, via an input/output-interface 170, which function or functions a molded body 102 to be manufactured shall have. The input/output-interface 170 may comprise input elements (for example a keyboard, a touchpad and/or a control panel) via which a user can transmit control commands to the device 100. The input/output-interface 170 may further comprise output elements (for example an electronic display) via which for example an information about a composition of the processed medium and/or other process parameters can be brought to the attention of a user. For example, the user can pre-give a certain color of the molded body 102 to be manufactured, a desired extent of elasticity, mechanical robustness, antimicrobial effect, etc. The control unit 140 may then access a database 152 (for example an electronic mass storage such as a hard disc), for example, where, for example in the form of a lookup table, correlations between target-functions of the molded body 102 to be manufactured and remaining concentrations of foreign matters which remain in the molded body 102 may be stored. For example, it may be stored in the lookup table that a corresponding presorting of the starting material 110 by colors and an omitting or correspondingly configuring a bleaching of the starting material 110 may be performed during performing the manufacturing method, for obtaining a certain color of the manufactured molded bodies 102 without the need of supplying a separate colorant. According to another embodiment, the lookup table may contain the information that, by retaining a certain amount of elastane in the starting material 110 and consequently in the lyocell-spinning solution 104, the manufactured molded bodies 102 may be imparted with a certain elasticity. Still another embodiment may assign the retaining of a certain amount of polyester from the starting material 110 in the molded body 102 to obtaining an increased mechanical strength of the molded bodies 102. Retaining a certain amount of zinc oxide from the starting material 110 in the molded bodies 102 may be correlated in the lookup table with an antimicrobial effect, which the manufactured molded bodies 102 may then show. In this way, the control unit 140 may use a target-function of the molded bodies 102, which is desired by a user, by means of an information from the database 152, for adapting process parameters and single process steps, respectively, of the manufacturing method according to FIG. 1 and FIG. 2, such that the desired function in the molded body 102 is achieved. In this way, foreign matters may be retained in the molded body 102 and may there be used for functionalizing the molded bodies 102.

In the following, additional embodiments of the invention are described. In particular, according to an exemplary embodiment, a functionalization of foreign components from recyclates may be performed by a selective further use of the pulp.

An exemplary embodiment of the invention relates to the functionalization of non-wood additional matters as foreign matters which originate from a recyclate and are re-integrated in a generated fiber in a targeted manner. Thereby, special properties of these additional matters are utilized and/or special properties of the generated fiber are achieved. Thus, embodiments of the invention show a possibility to realize and to intensify, respectively, recycling by special cycles. This may be performed by omitting unnecessary or even functionally undesired excessive purity and/or by the fact that a pre-use descriptively gets a criterion of an especially preferred recycling. The utilization of recycling-cellulose, preferably manufactured from old textiles, for the production of artificially manufactured cellulose-fibers without completely removing foreign matters is ecologically highly advantageous, since elaborate separating methods in the pulp manufacturing may be omitted or replaced by simpler separating methods and/or cleaning method. Secondary constituents from the cellulose-comprising raw materials (for example wood, corn stover, bagasse, cotton)

which conventionally have been considered as undesired, which therefore have been eliminated in the manufacturing method, according to an exemplary embodiment, may at least partially remain in a manufactured molded body 102 and may fulfill a specific additional function there.

A conventional prejudice consisted in that practically all additives have to be detracted from old textiles by partially complex method steps, in order to recover pure cellulose. Corresponding cleaning methods are elaborate and often ecologically questionable, such that the intended effect of an efficient resource-recovery is almost reversed to the contrary.

When using recycled materials as raw materials for the pulp manufacturing, an only moderate purity of these recyclates is to be assumed. Such recyclates are frequently contaminated with materials which are not typical for wood. The removal or dis-functionalization of these materials is elaborate and often environmentally polluting. The mentioned environmental pollution may concern both energy consumption (for example ozone generation in bleaching) and process secondary cycles (for example chemically depleting certain materials).

For manufacturing pulp for the utilization in lyocell-processes, recycling materials may be used in the pulp manufacturing. In the processing of these recycling materials (textile recycling), different foreign matters occur when a substance cycle is closed, which are removed in the manufacturing of the fiber, in order to achieve that the technical and physical, respectively, properties become similar and identical, respectively, with respect to a non-recycled fiber. Normally, such foreign matters (such as foreign polymers, metals or other chemical compounds) are removed (for example by chemical reactions, bleaching, mechanically filtering, etc.). In particular for manufacturing of viscose and fibers according to the lyocell-method, it is thus common to intend the complete depletion of foreign matters.

It was surprisingly found that by a targeted control of residual concentrations in the context of the depleting method (i.e, the recycling process), advantageous properties can be achieved in the resulting fiber and the produced pulp, respectively. This thus achieved functionalization of residual constituents from the recyclate is described in the following in the context of exemplary embodiments of the invention.

In particular, it has been found by the present inventors, that by the targeted control of recyclate portions in a pulp, desired properties in a specific application of a lyocell fiber may be supported, controlled or otherwise influenced. It has also turned out, that the environmental pollution which, by the logistic of a multiproduct assortment (i.e, differently manufacturing, processing, delivering, etc. pulps, dependent on their special residual portions) is substantially lower than a complete depletion of the foreign materials in a recyclate.

For a pulp according to an exemplary embodiment of the invention, old textiles on basis of cotton, viscose and/or lyocell-cellulose, and mixtures thereof and/or with other constituents, may be used. A functionalization of the partial degradation of the chain length in the context of the use takes place. It should in particular be noted that for example native cotton, due to its high DP-value (wherein DP denotes the average degree of polymerization, i.e. the number of the monomer units per macromolecule), is relatively hardly soluble in NMMO. In contrast, a recyclate with a corresponding cotton portion by the previous manufacturing and the subsequent use (in particular due to the influence of UV, heat, water, mechanical stress) is characterized in that the DP-value sinks to a range which enables a better solving in NMMO. Typical values for this shift of the Gaussian mean of the DP-values is from up to 3000 (and partially even above) in native cotton to a value at recyclates of below 2000 mL/g, preferably below 1000 mL/g, especially preferred below 800 mL/g. The mentioned values relate to a limiting viscosity number (which correlates with the degree of polymerization of the cellulose) in units mL/g. By means of optional, but advantageous additional measures, such as selection, mixing, boiling, etc., a GVZ-value in the range from 200 mL/g to 700 mL/g can be achieved, which is especially suitable for the lyocell-process.

In a preferred embodiment, the desired portions of titanium dioxide ($TiO_2$) are adjusted from recyclates. The such manufactured pulp or a mixture made of different pulps with the desired portion of $TiO_2$ can be processed to a lyocell-molded body 102. After further processing steps, a resulting staple fiber may thus comprise a portion of $TiO_2$ as foreign matter with a matting function.

In a further especially preferred embodiment, residual-polymers, for example polyester from recyclates, are used as adhesion promoter among the cellulose fibers or as thermoplastic properties promoter within a lyocell-molded body 102. Such polymers substantially stay inert until corresponding procedures in the production process are finished. In particular, a belated stiffening of a tissue by heat (descriptively in a similar way as with hotmelt glue) can be achieved (for example advantageously for manufacturing iron-free shirts, a pleating, etc.). For manufacturing tissues which shall have the property of a high dimensional stability (for example iron-free), a very simple method can thereby be provided.

By the targeted control of the portion of residual polymers (such as polyester from stitching threads of shirts), a certain thermoplasticity can be achieved in a lyocell-fiber as molded body 102 which brings back the corresponding portion of residual polymers from the recyclate via a pulp according to an exemplary embodiment of the invention via the lyocell-process to a fiber type (in the sense of a dedicated substance cycle), which may be used for manufacturing a dimensionally stable textile (for example a shirt), for example. Molded bodies 102 and products arising therefrom, respectively, with improved properties may be obtained synergistically (for example a better, i.e. higher, water retention, since by the fiber-inherent improved dimensional stability, less avivage for manufacturing an iron-free quality is required). Such a manufacturing, which is performed according to an exemplary embodiment of the invention, of a knitter-reduced textile product or a dimensionally stable nonwoven and fleece, respectively, constitutes an especially ecological variant of a targeted controlled substance cycle.

In a further especially preferred embodiment, recyclates of old textiles which have been dyed with vat dye (i.e. water-insoluble colorants with a special suitability for dying textiles on cellulose-base) (for example denim-textiles), are added to the pulp production in a targeted concentration and/or in selective color composition. By the manufacturing process, on the one hand colorants, such as denim-indigo, are indeed changed in its color, but on the other hand are deeply embedded in a lyocell-fiber. At the example of the denim textiles, different advantages of this approach can be shown. Denim textiles have at least one of the following properties:

Traditional denim: twill, i.e. diagonally running ridge and/or dense twill. In addition, it is differed between warp twill and weft twill, depending on whether the warp threads or the weft threads at the top predominate. The warp is blue, the weft is white. On a loom, denim is woven such that the bluer side is at the top. In order to protect the mechanics of the loom, denim is currently woven with the warp-side (in the above-mentioned case the upper side of the product and the blue side, respectively) facing downwards. Furthermore, a protection against pollutions of the currently upper side of the product in the weaving is thereby achieved.

Denim textiles are traditionally manufactured from cotton fibers. Originally, they have been continuously dyed a with indigo-colorants. However, at the present, yarns with variable coloring for denim textiles are utzilized.

Denim-variations: denim yarns are only colored at the surface for the purpose that the stonewash-effect can be manufactured more simply and more ecologically (i.e. with less effort in the sense of less utilized time and energy).

A lyocell-molded body 102 according to an exemplary embodiment of the invention, which is manufactured from a pulp with a defined and selected denim portion, has a white value which is deviating from that of a normal cotton fiber and may possibly even be directly color-carrying. A coloration through the entire fiber which is realized according to such an exemplary embodiment of the invention enables to mix the such manufactured fiber with a normal fiber. In particular, the coloration of the normal fiber may then be controlled, such that the colorant release for obtaining the stonewash-effect is performed in a suitable manner. By the residual portion of a fiber which is manufactured as molded body 102 according to an exemplary embodiment of the invention, it can be ensured (since for example continuous residual colorants are present), that this stonewash-effect does not especially concern this fiber portion. By additionally washing by the consumer, no further coloration takes place.

Another exemplary embodiment of the invention concerning the functionalization of the molded bodies 102 based on foreign matters in recyclates consists in a targeted bleaching of the partial old denim-colorants. Thereby, for example the indigo may be converted to isatin which leads in a denim-textile product to a typical yellowness according to the age. Using a pulp manufactured according to an exemplary embodiment of the invention further enables to reduce the cotton fiber portion in a denim product by molded bodies 102 according to an exemplary embodiment of the invention as a substitute. This is advantageously with respect to a global resource optimization (in particular a reduction of a cultivation area for cotton for enabling an increase of the cultivation area for food).

In a further especially preferred embodiment, recyclates for pulp manufacturing with biocidal properties are used. By a suitable recyclate selection and processing, these materials are still biocidal, also after the lyocell-process. Thereby, molded bodies 102 and products manufactured therefrom may be manufactured which provide a biocidal functionality (for example fleeces and nonwovens, respectively, for medical and cosmetic products, textiles in the medical field, odor-reducing sportswear, bedware with mites-protection, etc.).

The clean-keeping effect of a such equipped fiber as molded body 102 according to an exemplary embodiment of the invention is of advantage here.

In a further especially preferred embodiment, in the pulp production, recyclates with a substantial portion of lyocell-fibers as molded bodies 102 are used. By using such a pulp for the lyocell-process, recyclate products are possible which differ in their technical properties only very slightly from a lyocell-fiber which was manufactured without recyclate. In particular, in this embodiment, the white values and the strengths are highly correlated with the lyocell-fiber without recyclate.

In a further especially preferred embodiment, recyclates from old textiles are used on lyocell-basis and/or viscose-basis. Thereby, it may be enabled to obtain a low DP-value which is advantageous for a lyocell-process, without additional measures.

A pulp may be suitable for a lyocell-process, according to an exemplary embodiment of the invention. Such a pulp may contain a recyclate portion of higher than 3 weight percent. Furthermore, as foreign matter in a respective molded body 102, a non-wood non-pulp-portion may be present, in particular higher than 10 ppm, further in particular higher than 100 ppm. With advantage, the mentioned recyclate portion may originate from old textiles which originate from the same or similar applications as the products which are produced from the pulp and/or may comprise the same or similar raw material basis as the products and/or intermediate products which are produced from the pulp. These non-wood portions may originate from the recyclate. The used recyclates may have a DP-value from 100 mL/g to 2000 mL/g, preferably 150 mL/g to 1000 mL/g, especially preferred 200 mL/g to 700 mL/g, respectively expressed as GVZ. For example, the mentioned non-wood constituents may comprise more than 1 ppm (preferably more than 10 ppm or even more than 100 ppm) vat dyes (and their degradation components, for example indigo or isatin), polyester, $TiO_2$, optical brighteners, etc.

A molded body 102 manufactured according to an exemplary embodiment or a product manufactured therefrom may for example be utilized for one or more of the following applications:

a) pulp with polymer portion: this enables a heating of the product during its manufacturing or its lifetime to above 130° C., preferably above 150° C., especially preferred above 180° C.

b) Pulp with $TiO_2$: this enables an application with a requirement to sun protection and/or light-impermeability and/or visual protection c) pulp with portions or degradation elements of vat dyes: this enables to provide denim-like textile products d) pulp with recyclate portions from a lyocell-method: this enables the manufacturing of molded bodies 102 and products with lyocell-typical properties e) pulp with recyclate portions which contain optical brighteners: this enables the manufacturing of products with a high white value f) pulp with biocidal recyclate portions: this enables the manufacturing of molded bodies 102 and products with a biocidal function, respectively According to an exemplary embodiment of the invention, the mentioned pulp may be used for a lyocell-process and/or a lyocell-molded body 102 may be manufactured therefrom.

According to an exemplary embodiment, the recyclate portion of inorganic substances may be above 10 ppm, in particular above 100 ppm.

According to an exemplary embodiment, the recyclate portion of non-pulp substances may be above 100 ppm, in particular above 1000 ppm.

According to an exemplary embodiment, non-pulp organic substances may constitute more than 3 weight percent of the recyclate portion and may be embedded in the pulp.

Figure 3:
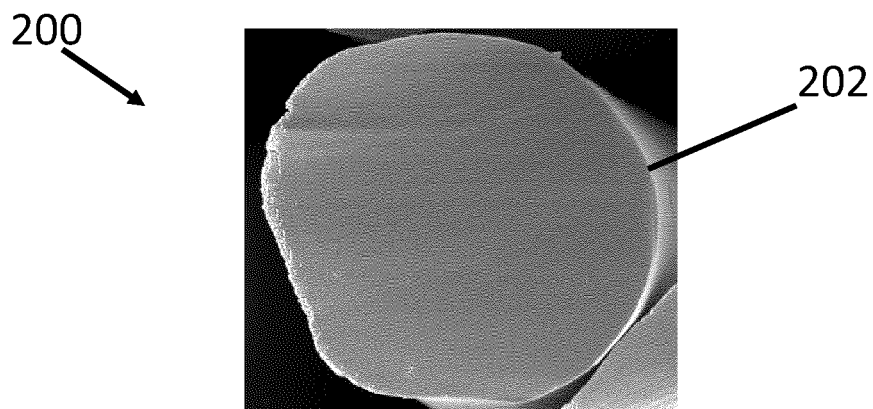
FIG. 3 shows a cellulose fiber which is manufactured by alyocell-method.

FIG. 3 shows a cellulose fiber 200 which is manufactured by means of a lyocell-method in cross-section. The cellulose fiber 200 which is manufactured by means of a lyocell-method has a smooth round outer surface 202 and is homogenous and free from macroscopic holes filled with cellulose material. Therefore, it can be unambiguously distinguished from cellulose fibers which are manufactured by means of a viscose-method (see reference sign 204 in FIG. 4) and from cellulose fibers of cotton plants (see reference sign 206 in FIG. 5) by a person skilled in the art.

Figure 4:
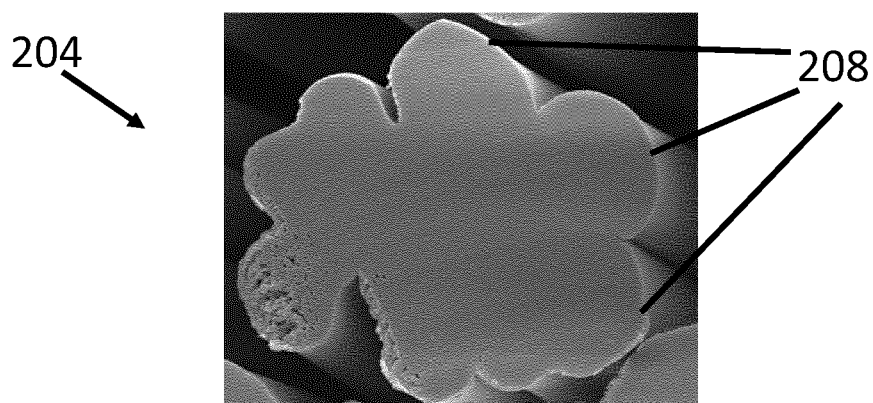
FIG. 4 shows a cellulose fiber which is manufactured by a viscose-method.

FIG. 4 shows a cellulose fiber 204 which is manufactured by means of a viscose-method in cross-section. The cellulose fiber 204 is cloud-shaped and comprises a plurality of arc-shaped structures 208 along its outer circumference.

Figure 5:
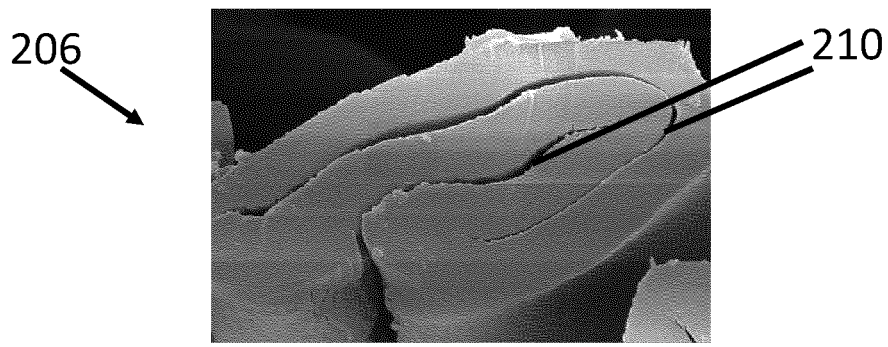
FIG. 5 shows a natural cellulose fiber of a cotton plant.

FIG. 5 shows a natural cellulose fiber 206 of a cotton plant in cross-section. The cellulose fiber 206 is kidney-shaped and comprises a lumen 210 which is free from material as a fully circumferentially enclosed hollow in an interior.

By means of the significant geometric and structural, respectively, differences of the fibers according to FIG. 3 to FIG. 5, it is possible for a person skilled in the art to unambiguously determine, for example by means of a microscope, whether a cellulose fiber is formed by means of the lyocell-method, by means of the viscose-method, or naturally in a cotton plant.

In addition, it should be noted that "comprising" does not exclude other elements or steps and "a" or "an" does not exclude a multiplicity. Furthermore, it should be noted that features or steps which are described with reference to one of the above embodiments may also be used in combination with other features or steps of other above described embodiments. Reference signs in the claims should not be construed as a limitation.

The invention claimed is:

1. Method of manufacturing a regenerated cellulosic molded body, wherein the method comprises:
   supplying a starting material which comprises cellulose and at least one foreign matter, wherein the cellulose and the at least one foreign matter of the starting material, when being supplied, are present in a common solid body composite;
   transferring at least a part of the starting material with at least a part of the at least one foreign matter into a spinning mass which additionally contains a solvent for solving at least a part of the cellulose of the starting material in the solvent;
   selectively adjusting a desired or pre-given residual concentration of the at least one foreign matter in the molded body for obtaining a technical function of the at least one foreign matter in the molded body; and
   extruding the spinning mass to the molded body and subsequently precipitating in a spinning bath, wherein thereby the molded body is obtained, wherein the molded body comprises cellulose and at least a part of the at least one foreign matter.

2. Method according to claim 1, wherein the method comprises at most partially removing at least one of the at least one foreign matter by separating a part of the at least one foreign matter from the cellulose of the starting material to precipitating.

3. Method according to claim 1, wherein the starting material comprises or consists of a cellulose source to be recycled that is completely or partially made of remains of a clothing manufacture and/or made of old clothes.

4. Method according to claim 1, wherein the at least one foreign matter comprises at least one of a group which is consisting of a colorant, an optical brightener, a matting agent, and an antimicrobial substance.

5. Method according to claim 1, wherein the at least one foreign matter comprises elastane which, during solving the cellulose, is also at least partially solved.

6. Method according to claim 1, wherein the at least one foreign matter comprises polyester which is at least partially retained in the starting material, when the starting material is at least partially solved.

7. Method according to claim 1, wherein the method comprises at least partially removing non-cellulosic fibers from the starting material prior to precipitating.

8. Method according to claim 1, wherein the method comprises at least partially removing metals from the starting material.

9. Method according to claim 1, wherein in the method the regenerated cellulosic molded body is manufactured without performing a bleaching procedure.

10. Method according to claim 1, wherein, prior to solving, the starting material is presorted by colors in multiple color groups and respectively only presorted starting material of a common color group is solved.

11. Method according to claim 1, wherein the at least one foreign matter which is present in the molded body has a portion of at least 0.01 weight percent with respect to the total weight of the molded body.

12. Method according to claim 1, wherein as molded body one of a group is manufactured which is consisting of fibers, foils, sponges or spheres.

13. Method according to claim 1, comprising at least one of the following features:
   wherein precipitating is caused by diluting the starting material solved in the spinning mass, by an aqueous environment in the spinning bath;
   wherein the method comprises comminuting, the starting material prior to solving the starting material in the solvent;
   wherein the starting material, prior to precipitating is at least partially freed from cross-linkers which are cross-linking fibers of the starting material;
   wherein the starting material, prior to its precipitating in the solvent is combined with another cellulose source, wherein in particular the other cellulose source comprises a material of a group which is consisting of wood pulp, rags pulp, cotton, cellulose manufactured by a lyocell-method, and cellulose manufactured by a viscose-method;
   wherein the method comprises postprocessing the precipitated molded body;
   wherein solving the starting material is performed by a direct solving method and/or by tertiary amine oxides as solvent;
   wherein the method is performed such that, based on a control command, an amount of the at least one foreign matter which is retained in the molded body to be manufactured, is adjusted in a user-defined manner;
   wherein the common solid body composite comprises at least one of a group which is consisting of a textile planar structure, a fiber composite and a molded body composite;
   wherein the method comprises further processing of manufactured molded bodies to a product.

14. The method according to claim 1, wherein manufacturing the regenerated cellulosic molded body comprises a lyocell method or a viscose method.

15. The method according to claim 1, comprising at least one of the following features:
   wherein elastane is used as foreign matter, in order to impart elasticity to the manufactured molded body;

wherein polyester is used as foreign matter, in order to impart a thermoplastic deformability and/or an increased mechanical stability to the molded body.

* * * * *